(12) United States Patent
Lacivita et al.

(10) Patent No.: US 10,924,821 B2
(45) Date of Patent: Feb. 16, 2021

(54) PROVIDING ADVANCED PLAYBACK AND CONTROL FUNCTIONALITY TO VIDEO CLIENT

(71) Applicant: Comcast Cable Communications Management, LLC, Philadelphia, PA (US)

(72) Inventors: Jeremy Lacivita, Seattle, WA (US); Daniel Niland, Seattle, WA (US); Curtis Fulton, Vashon, WA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

(21) Appl. No.: 15/829,355

(22) Filed: Dec. 1, 2017

(65) Prior Publication Data
US 2018/0302692 A1    Oct. 18, 2018

Related U.S. Application Data

(63) Continuation of application No. 14/976,535, filed on Dec. 21, 2015, now Pat. No. 9,930,427.

(51) Int. Cl.
| | |
|---|---|
| H04N 21/845 | (2011.01) |
| H04N 21/262 | (2011.01) |
| H04N 21/8547 | (2011.01) |
| H04L 29/08 | (2006.01) |
| H04N 7/16 | (2011.01) |
| H04N 21/266 | (2011.01) |

(Continued)

(52) U.S. Cl.
CPC ......... *H04N 21/8456* (2013.01); *H04L 67/06* (2013.01); *H04N 7/165* (2013.01); *H04N 21/26258* (2013.01); *H04N 21/26606* (2013.01); *H04N 21/4307* (2013.01); *H04N 21/4325* (2013.01); *H04N 21/4623* (2013.01); *H04N 21/812* (2013.01); *H04N 21/8133* (2013.01); *H04N 21/8402* (2013.01); *H04N 21/8547* (2013.01)

(58) Field of Classification Search
CPC combination set(s) only.
See application file for complete search history.

(56) References Cited

U.S. PATENT DOCUMENTS

2010/0062844 A1    3/2010    Crowder et al.
2011/0080940 A1    4/2011    Bocharov et al.
(Continued)

OTHER PUBLICATIONS

Jin Young Lee et al: "DASH Evaluation Experiment #1: Compositions of Media Presentation (CMP) Proposal Comparison", 94. MPEG Meeting; Oct. 11, 2010-Oct. 15, 2010; Guangzhou; (Motion Picture Expert Group or ISO/IEC JTC1/SC29/WG11), No. M18009, Sep. 10, 2010 (Sep. 10, 2010).
(Continued)

*Primary Examiner* — Alexander Gee
(74) *Attorney, Agent, or Firm* — BakerHostetler

(57) ABSTRACT

Systems and methods for providing playback features to a device are disclosed. A manifest may be generated, which may comprise data associated with a content asset. A state file may be generated, which may comprise data associated with the manifest. Using one or more of the manifest and the state file, a device may modify segments of the content asset or may playback segments of the content asset.

20 Claims, 7 Drawing Sheets

(51) Int. Cl.
*H04N 21/43* (2011.01)
*H04N 21/432* (2011.01)
*H04N 21/4623* (2011.01)
*H04N 21/81* (2011.01)
*H04N 21/84* (2011.01)

(56) References Cited

U.S. PATENT DOCUMENTS

| | | | | |
|---|---|---|---|---|
| 2011/0238789 | A1* | 9/2011 | Luby | H04L 65/604 709/219 |
| 2013/0121489 | A1* | 5/2013 | Pestoni | H04L 9/0822 380/210 |
| 2014/0019635 | A1* | 1/2014 | Reznik | H04N 21/6332 709/231 |
| 2014/0059244 | A1 | 2/2014 | Panje et al. | |
| 2014/0115472 | A1* | 4/2014 | Mochinaga | H04N 13/189 715/719 |
| 2014/0359680 | A1 | 12/2014 | Shivadas et al. | |
| 2015/0271234 | A1* | 9/2015 | O'Malley | H04N 21/8456 709/219 |
| 2015/0347577 | A1* | 12/2015 | Miyazaki | H04L 65/60 707/752 |
| 2016/0294898 | A1* | 10/2016 | Wheelock | H04L 65/602 |

OTHER PUBLICATIONS

Iraj Sodagar: "[TuC] Playback Control Signaling", 111. MPEG Meeting; Feb. 6, 2015-Feb. 20, 2015; Geneva; (Motion Picture Expert Group or ISO/IEC JTC1/SC29/WG11), No. m35928, Feb. 14, 2015 (Feb. 14, 2015).

I Raj Sodagar: "[CAPC0] Playback Control:improvements to the CPD proposal", 113. MPEG Meeting; Oct. 19, 2015-Oct. 23, 2015; Geneva; (Motion Picture Expert Group or ISO/IEC JTC1/SC29/WG11),, No. m37085, Oct. 14, 2015 (Oct. 14, 2015).

"Draft Text of ISO/IEC 23009-1 3rd edition", 113. MPEG Meeting;Oct. 19, 2015-Oct. 23, 2015; Geneva; (Motion Picture Expert Group or ISO/IEC JTC1/SC29/WG11),, No. N15686, Dec. 8, 2015 (Dec. 8, 2015), XP030022374.

\* cited by examiner

PROVIDING ADVANCED PLAYBACK AND CONTROL FUNCTIONALITY TO VIDEO CLIENT

CROSS REFERENCE TO RELATED APPLICATIONS

This application is a continuation of U.S. patent application Ser. No. 14/976,535, filed on Dec. 21, 2015.

BACKGROUND

Many devices are capable of connecting to a network such as the Internet to stream video. More robust devices are capable of not only connecting to and streaming video, but also of decoding tags in the video stream itself. Such tags can be decoded to provide additional functionality like advertising cues, advanced playback controls, and restriction and entitlement logic. However, a growing number of simple devices (e.g., browsers implementing HTML5) do not have the necessary capability to decode the embedded tags and therefore, are not able to access the additional functionality provided by such tags. These and other shortcomings are identified and addressed by the disclosure.

SUMMARY

Methods and systems for providing advance playback and control functionality to a video client are disclosed. The methods and systems disclosed may allow user devices (e.g., content playback devices, media players, etc.) to determine time-related information associated with manifests being processed by the user devices. As an example, a state file may be generated and provided to the user devices to facilitate determination of such time-related information. The state file may comprise information such as a time code and/or an event marker associated with the generation of a manifest. As such, the user device may receive the manifest and a synchronized state file and may process the state file to facilitate the execution of advanced playback and control functionality (e.g., advertising cues, advanced playback controls, and restriction and entitlement logic).

The methods and systems may comprise generating a manifest associated with at least a first segment of a content asset. The manifest may comprise a first time code. A state file may also be generated comprising a second time code to allow synchronization with the first time code of the manifest. The manifest and the state file may be transmitted to a recipient device, wherein processing of the state file facilitates one or more playback features associated with at least the first segment of the content asset.

DETAILED DESCRIPTION

Various devices (e.g., media players) may not configured to decode certain embedded information from a content stream such as an IP video stream. The systems and methods of the present disclosure provide a mechanism to allow such devices to obtain information associated with a content stream that was previously not available to the devices. As an example, a manifest can be generated associated with a particular content asset. Along with the manifest, a supplemental file, such as a state file can be generated and provided to the user devices along with the manifest. The state file can include information such as a time code, an event marker, and/or additional metadata associated with the playback and control features of the user device. The information in the state file can be processed by the receiving user device to facilitate the execution of advanced playback and control functionality (e.g., advertising cues, advanced playback controls, and restriction and entitlement logic). The state file can be generated as part of the transcoding process of the underlying content stream and can be synchronized in time with the associated manifest, for example, using the embedded time code as a synchronization marker. These and other aspects will be discussed in reference to the accompanying figures.

Figure 1:
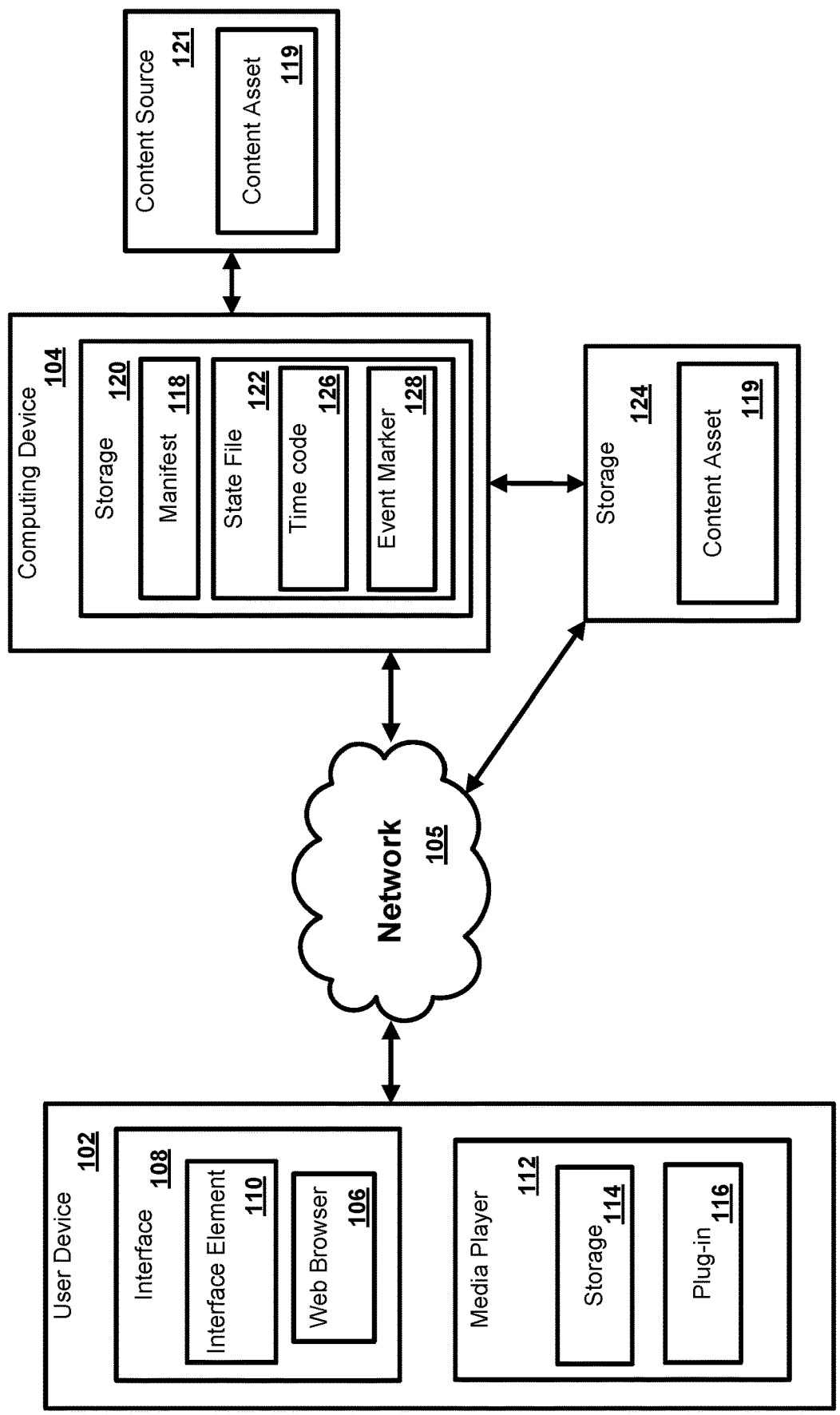
FIG. 1 is a block diagram of an example network.

FIG. 1 illustrates various aspects of an exemplary network in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 and network can comprise a user device 102 in communication with a computing device 104, such as a server, for example. The computing device 104 can be disposed locally or remotely relative to the user device 102. As an example, the user device 102 and the computing device 104 can be in communication via a network 105 such as private or public network (e.g., Internet). Other forms of communications can be used, such as wired and wireless telecommunication channels, for example.

In an aspect, the user device 102 can be an electronic device such as a computer, a smartphone, a laptop, a tablet, a set top box, or other device capable of communicating with the computing device 104. As an example, the user device 102 can comprise a web browser 106 for providing an interface to a user to interact with the user device 102 and/or the computing device 104. The web browser 106 can be any interface for presenting information to the user and receiving a user feedback such as Internet Explorer, Mozilla Firefox, Google Chrome, Safari, or the like. Other software, hardware, and/or interfaces can be used to provide communication between the user and one or more of the user device 102 and the computing device 104. As an example, the web browser 106 can request or query various files from a local source and/or a remote source.

In an aspect, the user device 102 can comprise an interface 108 such as a user interface or API. As an example, the interface 108 can be configured to provide a visual presentation, audio presentation, interactive communication, and the like. As a further example, interface 108 can comprise one or more interface elements 110. In an aspect, the interface elements 110 can comprise a menu, icon, user-selectable button, drop-down, slider bar, input field, and the like. As an example, one or more of the interface elements 110 can be configured to receive a selection or input from a user.

The user device 102 can comprise a media player 112 configured to process information to cause playback of content via the interface 108. In an aspect, the media player 112 may comprise the web browser 106 and/or software to effect playback of content and features relating to such playback. As an example, the media player 112 can be configured to transmit a request, such as a HTTP GET or POST request over network 105 to the computing device 104. The user device 102 can also explicitly send parameter data to the computing device 104 voluntarily or in response to a request for client parameters. The computing device 104 may then evaluate various business rules and may retrieve or generate a manifest 118 (or manifests), which can then be passed back to user device 102 over network 105 and placed into storage 114.

The media player 112 can process the manifest 118 to playback video content via the interface 108. For example, the manifest 118 may reference one or more segments of a content asset 119, for example, in storage 124. Thus, the manifest 118 may comprise a playlist file such as a M3U8 playlist file. The media player 112 may then request, stream, decode, and output the referenced content segments seamlessly to the interface 108 to playback the requested portion of the content asset 119. Although reference is made to the manifest 118, it is understood that any number of manifests may be used in a similar manner.

As an example, the storage device 124 can be in communication with one or more of the user device 102 and the computing device 104 to send/receive data such as content segments and/or index information associated with one or more content asset 119. As a further example, the storage device 124 can be located remotely from the user device 102, such as a network storage medium, network digital video recorder system, and the like. In an aspect, to manage the content asset 119 (or assets) accessed via the storage device 124, and/or other devices, a manifest (e.g., manifest can be generated as an index of data stored in one or more locations and/or in one or more storage mediums.

In an aspect, one or more software components such as plug-ins 116 can be provided to the user device 102. As an example, plug-ins 116 can comprise an extension or software component that adds specific abilities to another software application. As an example, one or more plug-ins 116 can be configured to customize the functionality of a particular application such as the interface 108.

In an aspect, the computing device 104 can be a network device such as a server (e.g., manifest server) for communicating with the user device 102. As an example, the computing device 104 can communicate with the user device 102 for providing services such as network (e.g., IP) services using one or more protocols (e.g., FTP, HTTP, etc.).

In an aspect, the computing device 104 can manage the communication between the user device 102 and storage 120 for sending and receiving data therebetween. As an example, the storage 120 can store a plurality of data sets, manifest 118, content asset 119, user identifiers or records, authentication information, or other information. As a further example, the user device 102 can request and/or retrieve a file from the storage 120 such as the manifest 118. The storage 120 can be integrated with the computing device 104 or some other device or system.

In an aspect, the computing device 104 can be configured to encode/transcode the content asset 119 such as a content stream received from a content source 121. Although reference is made to the content asset 119, it is understood that any number of content assets may be used in a similar manner. The content asset 119 can be or comprise linear (e.g., live) broadcast content and/or non-linear (e.g., video on demand, recorded, etc.) content. As an example, the computing device 104 can receive a linear content stream (e.g., content asset 119) in a first format such as MPEG-2 and can transcode the content stream into a second format such as MPEG-4. The computing device 104 can be configured to provide a plurality of content segments (e.g., 2 second playback segments) representing the content stream and can store the content segments for subsequent retrieval. The computing device 104 can generate a manifest (e.g., manifest 118) including information relating to the retrieval of the content segments for playback. The computing device 104 can generate a state file 122 associated with the content segments and/or the manifest. For example, the state file 122 can comprise information such as a time code 126 associated with the transcoding time of the content segments and/or the generation of the associated manifest. The state file 122 can comprise an event marker 128 associated with the content segments and/or the manifest 118. As an example, the event marker 128 can represent a version of the manifest 118.

In another aspect, the manifest 118 can comprise the locations of various quality level (bitrate and resolution) content segments located at network storage or local device storage or combination thereof. As an example, a device can receive the manifest 118 and can dynamically request particular data to be received. Transmission of any combination various content segments having varying network/local storage locations can be facilitated on the segment-by-segment basis using a plurality of manifests (e.g., manifest 118). For example, a plurality of the manifests 118 can be updated on a segment-by-segment basis by the computing device 104.). One or more of the manifests 118 can represent a version of another one of the manifest 118. For example, one manifest 118 may represent a particular bit rate of a content segment, while another version of the manifest 118 represents the same content segment having a different bit rate. Such versions of the manifests 118 can include differences such as language (e.g., audio and/or closed captioning options), image dimensions, output limitations such as audio-only, and the like.

The manifests 118 can provide location information that can be processed by the user device 102 (e.g., the media player 112 executing via the user device 102) to facilitate locating and/or requesting particular data segments (e.g., content segments) from one or more of a plurality of sources. As such, the user device 102 or other recipient device of the manifest(s) 118 can use the manifest to retrieve content for presentation to a user, for example via an interface such as interface 108, shown in FIG. 2.

Figure 2:
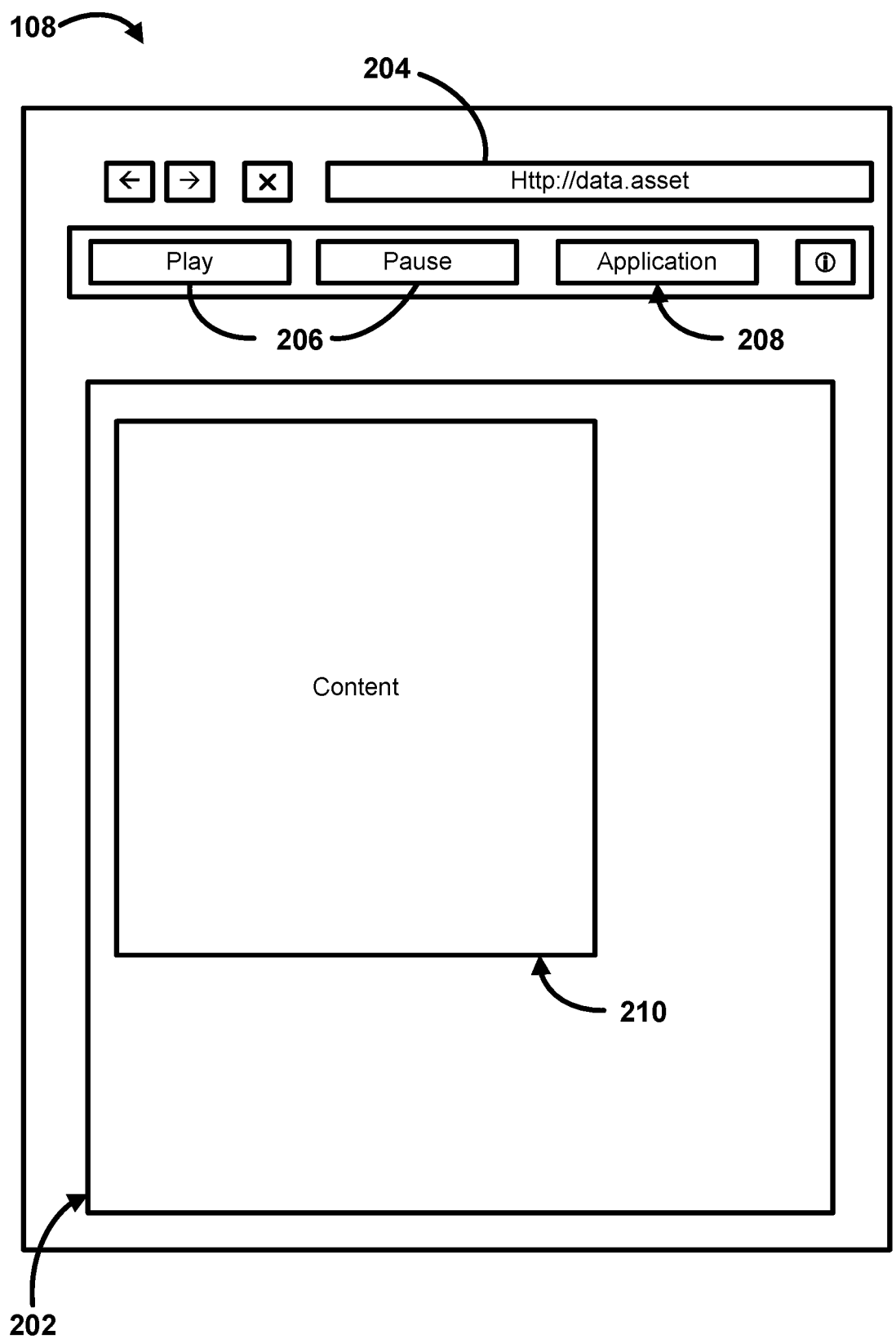
FIG. 2 is a representation of an example interface.

By way of example, the interface 108 (FIG. 2) can be loaded to the user device 102 as an add-on software package. The methods and systems disclosed can utilize one or more interfaces 108 to perform one or more functions in one or more locations. FIG. 2 illustrates an exemplary interface 108 for performing the disclosed methods. This exemplary interface 108 is only an example of an interface and is not intended to suggest any limitation as to the scope of use or functionality of interface architecture. Neither should the interface 108 be interpreted as having any dependency or requirement associated with any one or combination of components illustrated in the interface 108.

In an aspect, the interface 108 can comprise a viewing window 202 for displaying information (e.g. web pages, files, etc.) to the user. As an example, the interface 108 can comprise an address bar 204 or URL bar to allow a user to input a URL for directing the requests of the interface 108. In an aspect, the interface 108 can comprise a toolbar disposed adjacent the address bar 204 of the interface 108 and including one or more interface elements, buttons, or engageable menus. The interface 108 can be presented to the user in any position, form, and environment. As an example, the interface 108 can comprise a plurality of interface elements, such as user-engageable buttons 206 for executing various associated functions (e.g. search function, settings modification, play, pause, seek, and the like.)

In an aspect, the interface 108 can comprise an interface element such as home button, preset function, or pointer for directing the interface 108 to a pre-defined file or webpage, and/or a plug-in, extension, or an application 208 requiring a plug-in or extension. In another aspect, the interface 108 can be configured to present data to a user such as via the viewing window 202. As an example, the interface 108 can present content 210 to a user. As a further example, the interface elements can be used to interact with the content 210.

Figure 3:
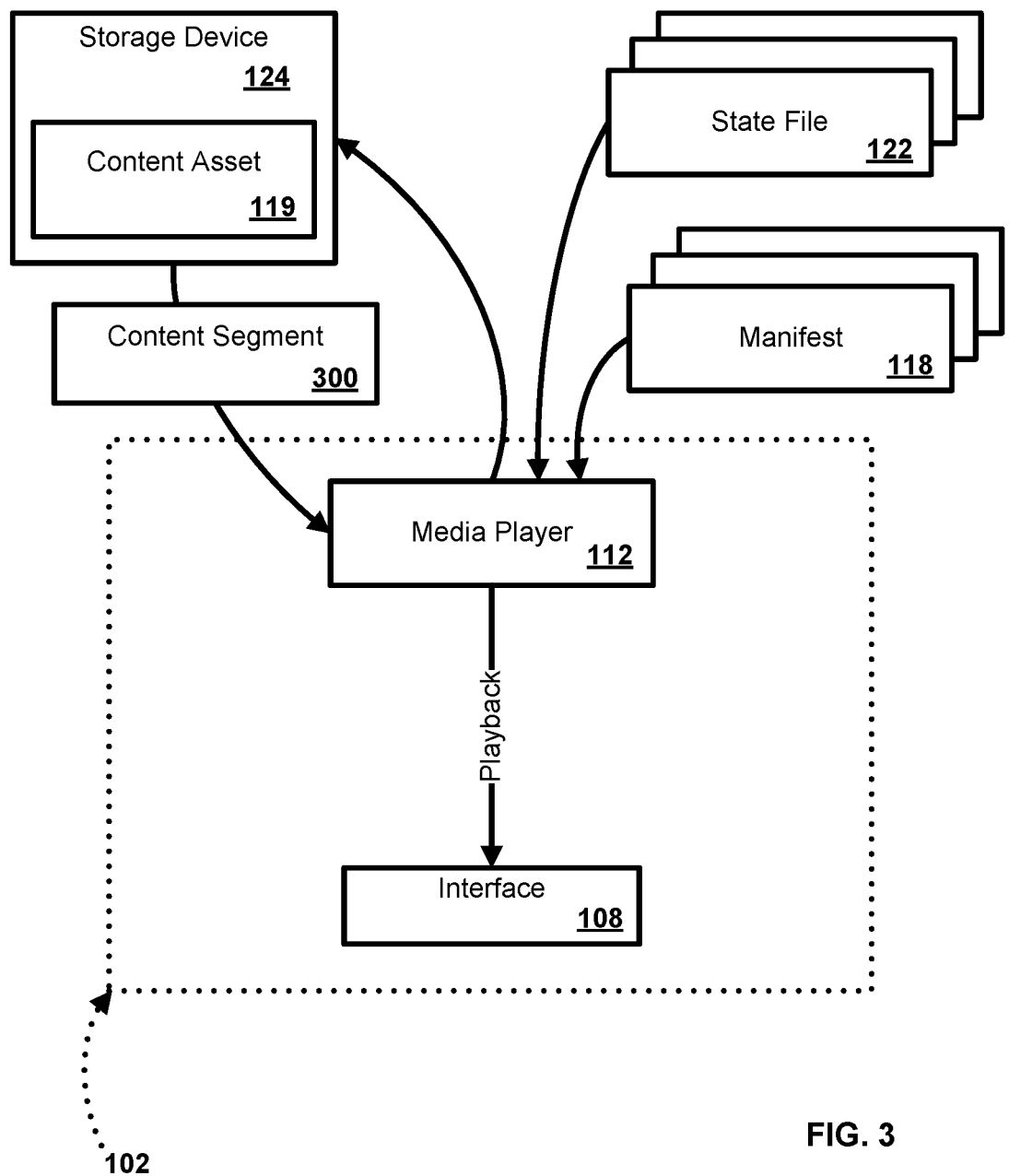
FIG. 3 is a representation of an example system and data flow.

FIG. 3 is a block diagram of an example system according to aspects of the present disclosure. In an aspect, a device such as the user device 102 and/or the media player 112 can be configured to receive one or more (e.g., a series) of manifests such as the manifest 118. The manifest 118 (or manifests) can comprise identifiers associated with one or more content assets such as videos, segments, data blocks, and the like. In an aspect, the manifest 118 can comprise information associated with one or more segments of the content assets such as location, bitrate, resolution, and the like. When the location of one or more of the data segments is changed, one or more of the manifests 118 can be modified to reflect the updated location of the data segments. As an example, a device, such as computing device 104 (FIG. 1), can be configured to monitor locations of one or more data segments or items and can automatically update the manifest 118 to reflect up-to-date location information of the data segments. As a further example, information associated with the location of the data segments can be accessed or received and the manifest 118 can be generated in real-time.

In one aspect, the manifests 118 can comprise an index of data segments such as segments of a content asset. The index can comprise an index value associated with each data segment. The index values can indicate temporal order for playback of the data segments. For example, the index values can be time values according to a time length of playback of the content. The time values can be based on a time scale associated with the content asset. As a further example, the time scale can begin at beginning of the content and end at the end of the content. In another aspect, the index value can comprise a number indicating the place of the data fragment in the sequential order of playback.

In one aspect, the manifests 118 can comprise location identifiers configured to indicate the location where the data segments can be accessed. For example, the location of each data fragment can be indicated by a uniform resource identifier, such as a uniform resource locator (URL). The URL can comprise, for example, a hypertext transfer protocol link or other link.

In one aspect, a device such as the user device 102 and/or the media player 112 can be configured to receive one or more of the state files 122. The state files 122 can comprise information such as a time code associated with the transcoding time of the content segments and/or the generation of the associated manifest. One or more of the state files 122 can comprise an event marker associated with the content segments and/or the manifest 118. As an example, the event marker can represent a version of the manifest 118. One or more of the state files 122 can comprise supplemental information associated with the execution of a playback features such as permissions, advertisement insertion, trick play features, and the like.

As an example, one or more of the state files 122 can comprise information associated with access restrictions associated with the data fragments. For example, one or more of the state files 122 can comprise instructions that specific data segments are not to be skipped in playback of the content. In another aspect, one or more of the state files 122 can comprise indications of media format (e.g., MIME types such as video/mp4), type of delivery (e.g., live streaming format with access patterns that accommodate potentially infinite duration, or on-demand format where the content duration is known and finite), digital rights management (DRM) information used for playback, indications for multilingual content (e.g., audio and data fragments associated with specific languages), and the like. One or more of the state files 122 may include information associated with content manipulation such as trick play features, bugs, overlays, or other graphical controls that can be customized to the version of an associated manifest 118.

In an aspect, the media player 112 can receive the manifests 118 and can request particular data segments to be received based at least on the received manifest 118. Transmission of any combination of various data segments having varying quality level and network/local storage location can be facilitated on a segment by segment basis based on the manifest 118. As an example, a first one of the manifest 118 can relate to a first content segment 300 of a non-linear content asset (e.g., content asset 119), wherein the first content segment 300 has a playback duration that is less than the playback duration of the entire non-linear content asset.

The computing device 104 and/or the media player 112 can process at least one of the state files 122 to determine which version of the manifest 118 is being used to retrieve content and/or which version of the manifest 118 is intended to be provided to a particular user device 102. As such, computing device 104 and/or the media player 112, plugins, and/or software applications interfacing with the media player 112 can know what content is being processed by the media player 112 based on the version of the manifest 118 parsed from the state file 122. Since the version of the manifest 118 is known and the content is known, various playback features can be executed that relate to the specific content in playback. Accordingly, the media player 112 that may not be able to parse certain embedded information from a content stream, may instead process the distinct state file 122 to facilitate playback features that were previously unavailable.

When the media player 112 reaches the end of the first one of the manifests 118, the user device can request and receive a second one of the manifests 118 to continue the seamless playback of content such as the next segment of the non-linear content asset or an advertisement, etc. As new manifests 118 are generated and transmitted to the media player 112, new state files 122 can be generated and transmitted in time synchronization with associated manifests 118.

Figure 4:
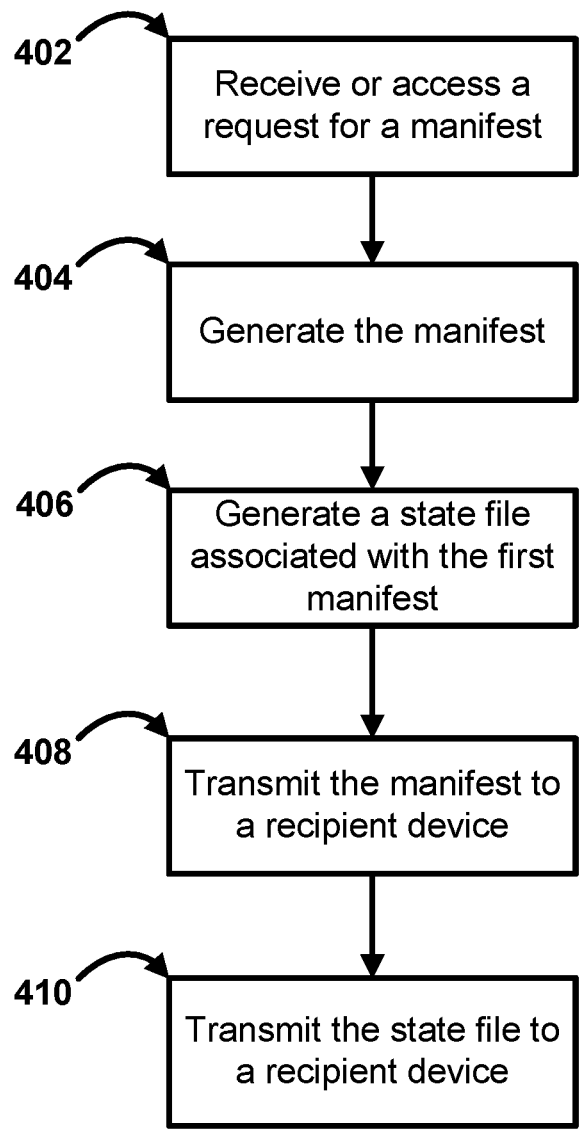
FIG. 4 is a flow chart of an example method.

FIG. 4 illustrates an example method for managing playback of content. In step 402, a request for a manifest can be received or accessed by a computing device (e.g., the computing device 104) such as a manifest server, for example. The manifest can comprise information associated with a location of one or more segments of a content asset such as an IP address, identifier of one or more content assets (e.g., advertisements, video on demand assets, recorded asset) browser or operating platform, device identifiers, browser cookies or login details, screen resolution of display, and other device, display, content, or user parameters. As an example, a user device and/or a media player executing on the user device can comprise a web browser (e.g., HLS enabled web browser). The user device can display a list of available content. For example, a user can use the media player to navigate to a website presenting a list of available content. After the user selects the content for playback, a request for the first manifest, such as a HTTP GET or POST request, can be sent over a network to the computing device. For example, the user device can receive a selection of an available content and can transmit a request for the first manifest.

In step 404, a manifest can be generated. In an aspect, the manifest can be generated in response to the request for the manifest. However, a manifest can be generated in response to encoding/transcoding of content and can be stored for subsequent retrieval. The manifest can comprise information associated with a location of one or more segments of a content asset. As an example, the computing device 104 (FIG. 1) can generate (e.g., create, retrieve, cause to be transferred, etc.) a manifest (or manifests), which can then be transmitted to the user device 102 over a network.

In step 406, a state file can be generated. As an example, the computing device 104 (FIG. 1) can generate (e.g., create, retrieve, cause to be transferred, etc.) the state file (or state files), which can be transmitted to the user device 102 over a network. The state file can relate to the content segments and/or the manifest. For example, the state file can comprise information such as a time code associated with the transcoding time of the content segments and/or the generation of the associated manifest. The state file can comprise an event marker associated with the content segments and/or the manifest. As an example, the event marker can represent a version of the manifest. As such, the event marker can be used to validate which manifest is being processed to retrieve content and customized playback features can be made available based on the particular version of the manifest.

As an example, the state file can comprise information associated with access restrictions associated with the data fragments. For example, state file can comprise instructions that specific data segments are not to be skipped in playback of the content. In another aspect, the state file can comprise indications of media format (e.g., MIME types such as video/mp4), type of delivery (e.g., live streaming format with access patterns that accommodate potentially infinite duration, or on-demand format where the content duration is known and finite), digital rights management (DRM) information used for playback, indications for multilingual content (e.g., audio and data fragments associated with specific languages), and the like.

In step 408, the manifest can be transmitted, for example, to a recipient device (e.g., user device 102 (FIG. 1)) such as a source of the request for the manifest. The manifest may facilitate access at least a portion of a content asset. In an aspect, a user device and/or a media player can receive the manifest and can request particular data segments to be received based at least on the received manifest. As an example, a first one of the manifests can relate to a first content segment of a content asset. When the media player reaches the end of the first one of the manifests, the media player can request and receive a second one of the manifests to continue the seamless playback of content such as the next segment of the content asset or an advertisement, etc.

In step 410, the state file can be transmitted to the recipient device. The state file can facilitate the execution of one or more playback features by the recipient device. The one or more playback features relate to at least the first segment of the content asset. For example, the one or more playback features can comprise one or more of an advertising cue, content manipulation, and entitlement logic that can be caused to execute via a recipient device that does not have such playback features natively available.

Figure 5:
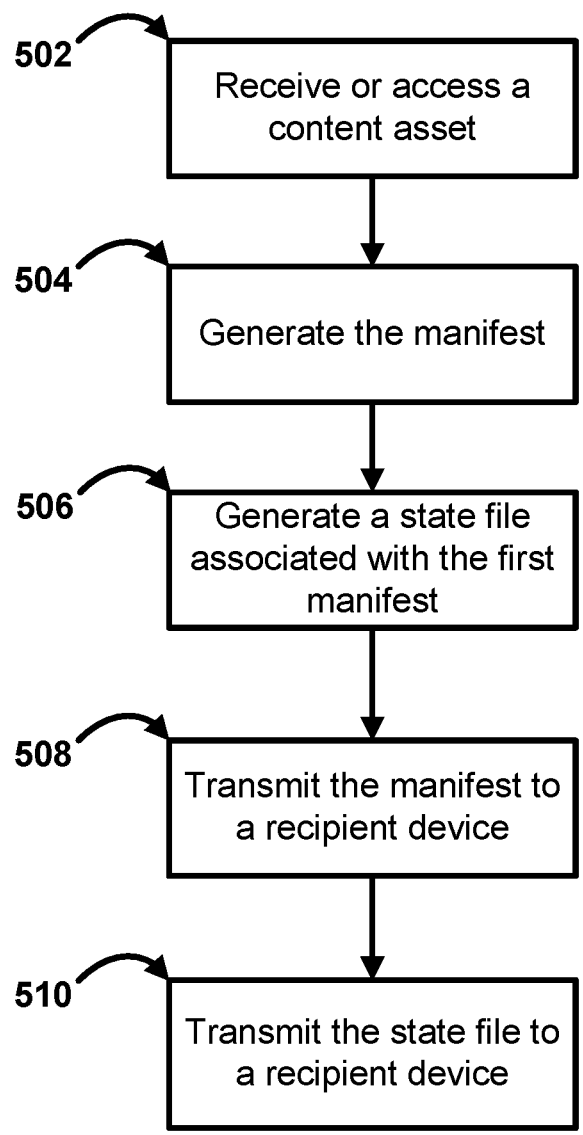
FIG. 5 is a flow chart of an example method.

FIG. 5 illustrates an example method for managing playback of content. In step 502, a content asset can be received or accessed. In an aspect, the content asset can be received from a content source over a network. The content asset can be received by a device configured to encode/transcode the content asset to generate one or more content segments for subsequent retrieval.

In step 504, a manifest can be generated. In an aspect, the manifest can be generated based on an encoding/transcoding of the content asset. However, manifests can be generated in response to encoding/transcoding of content and can be stored for subsequent retrieval. The manifest can comprise information associated with a location of one or more segments of a content asset.

In step 506, a state file can be generated. The state file can relate to the content segments and/or the manifest. For example, the state file can comprise information such as a time code associated with the transcoding time of the content segments and/or the generation of the associated manifest. The state file can comprise an event marker associated with the content segments and/or the manifest. As an example, the event marker can represent a version of the manifest.

As an example, the state file can comprise information associated with access restrictions associated with the data fragments. For example, state file can comprise instructions that specific data segments are not to be skipped in playback of the content. In another aspect, the state file can comprise indications of media format (e.g., MIME types such as video/mp4), type of delivery (e.g., live streaming format with access patterns that accommodate potentially infinite duration, or on-demand format where the content duration is known and finite), digital rights management (DRM) information used for playback, indications for multilingual content (e.g., audio and data fragments associated with specific languages), and the like.

In step 508, the manifest can be transmitted, for example, to a recipient device such as a source of the request for the manifest. The manifest may facilitate access at least a portion of a content asset. In an aspect, a user device and/or a media player can receive the manifest and can request particular data segments to be received based at least on the received manifest. As an example, a first one of the manifests can relate to a first content segment of a content asset. When the media player reaches the end of the first one of the manifests, the media player can request and receive a second one of the manifests to continue the seamless playback of content such as the next segment of the content asset or an advertisement, etc.

In step 510, the state file can be transmitted to the recipient device. The state file can facilitate the execution of one or more playback features by the recipient device. The one or more playback features relate to at least the first segment of the content asset. For example, the one or more playback features can comprise one or more of an advertising cue, content manipulation, and entitlement logic that can be caused to execute via a recipient device that does not have such playback features natively available.

Figure 6:
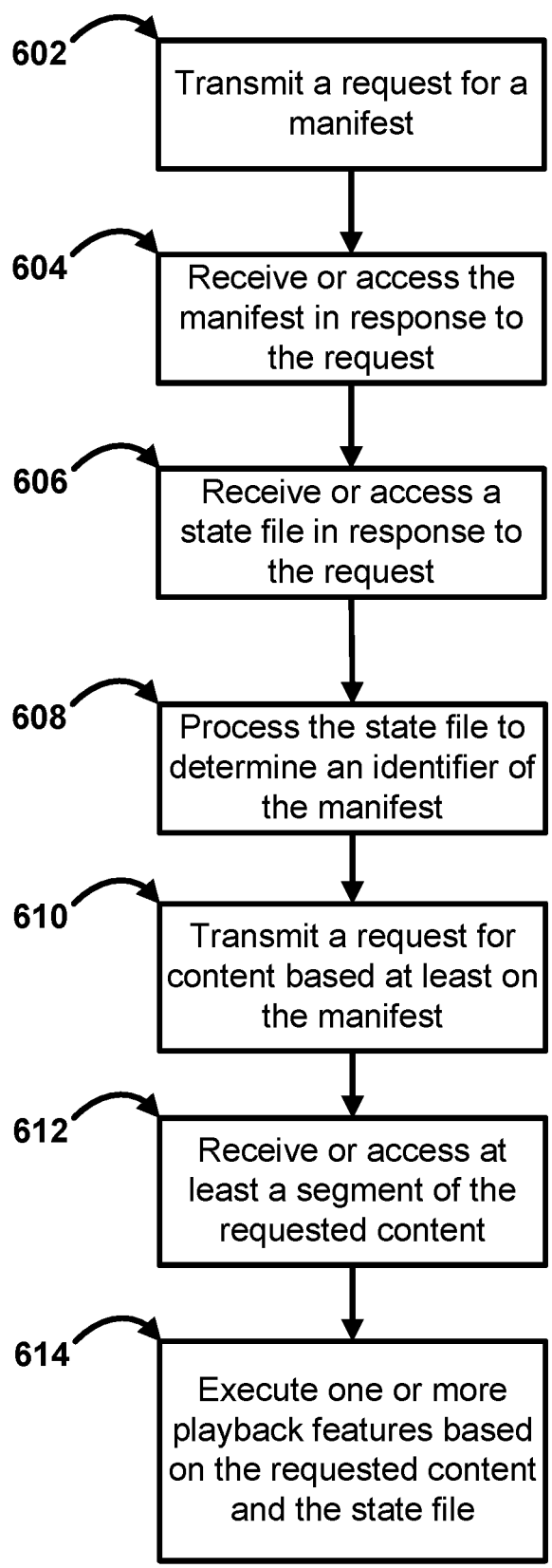
FIG. 6 is a flow chart of an example method.

FIG. 6 illustrates an example method for managing playback of content. In step 602, a request for a manifest can be transmitted by a device (e.g., the user device 102, the media player 112). As an example, a user device and/or a media player executing on the user device can comprise a web browser (e.g., HLS enabled web browser). The user device can display a list of available content. For example, a user can use the media player to navigate to a website presenting a list of available content. After the user selects the content for playback, a request for the manifest, such as a HTTP GET or POST request, can be sent over a network to the computing device. For example, the user device can receive a selection of an available content and can transmit a request for the manifest.

In step 604, the manifest can be accessed or received. The manifest can comprise information associated with a location of one or more segments of a content asset such as an IP address, identifier of one or more content assets (e.g., advertisements, video on demand assets, recorded asset) browser or operating platform, device identifiers, browser cookies or login details, screen resolution of display, and other device, display, content, or user parameters. In an aspect, the manifest can be generated in response to the request for the manifest. However, manifests can be generated in response to encoding/transcoding of content and can be stored for subsequent retrieval. The manifest can be used to request at least one segment of a content asset, in step 610, and the at least one segment can be received in step 612.

In step 606, a state file can be received or accessed. The state file can relate to the content segments and/or the manifest. For example, the state file can comprise information such as a time code associated with the transcoding time of the content segments and/or the generation of the associated manifest. The state file can comprise an event marker associated with the content segments and/or the manifest. As an example, the event marker can represent a version of the manifest.

As an example, the state file can comprise information associated with access restrictions associated with the data fragments. For example, state file can comprise instructions that specific data segments are not to be skipped in playback of the content. In another aspect, the state file can comprise indications of media format (e.g., MIME types such as video/mp4), type of delivery (e.g., live streaming format with access patterns that accommodate potentially infinite duration, or on-demand format where the content duration is known and finite), digital rights management (DRM) information used for playback, indications for multilingual content (e.g., audio and data fragments associated with specific languages), and the like.

In step 608, the state file can be processed to determine the identifier of the first manifest. As an example, the computing device 104 and/or the media player 112 can process the state file to determine which version of the manifest is being used to retrieve content (see step 610). As such, computing device 104 and/or the media player 112, plugins, and/or software applications interfacing with the media player 112 can know what content is being processed by the media player 112 based on the version of the manifest parsed from the state file. Since the version of the manifest is known and the content is known, various playback features can be executed that relate to the specific content in playback, in step 614. Accordingly, the media player that may not be able to parse certain embedded information from a content stream, may instead process the distinct state file to facilitate playback features that were previously unavailable.

Figure 7:
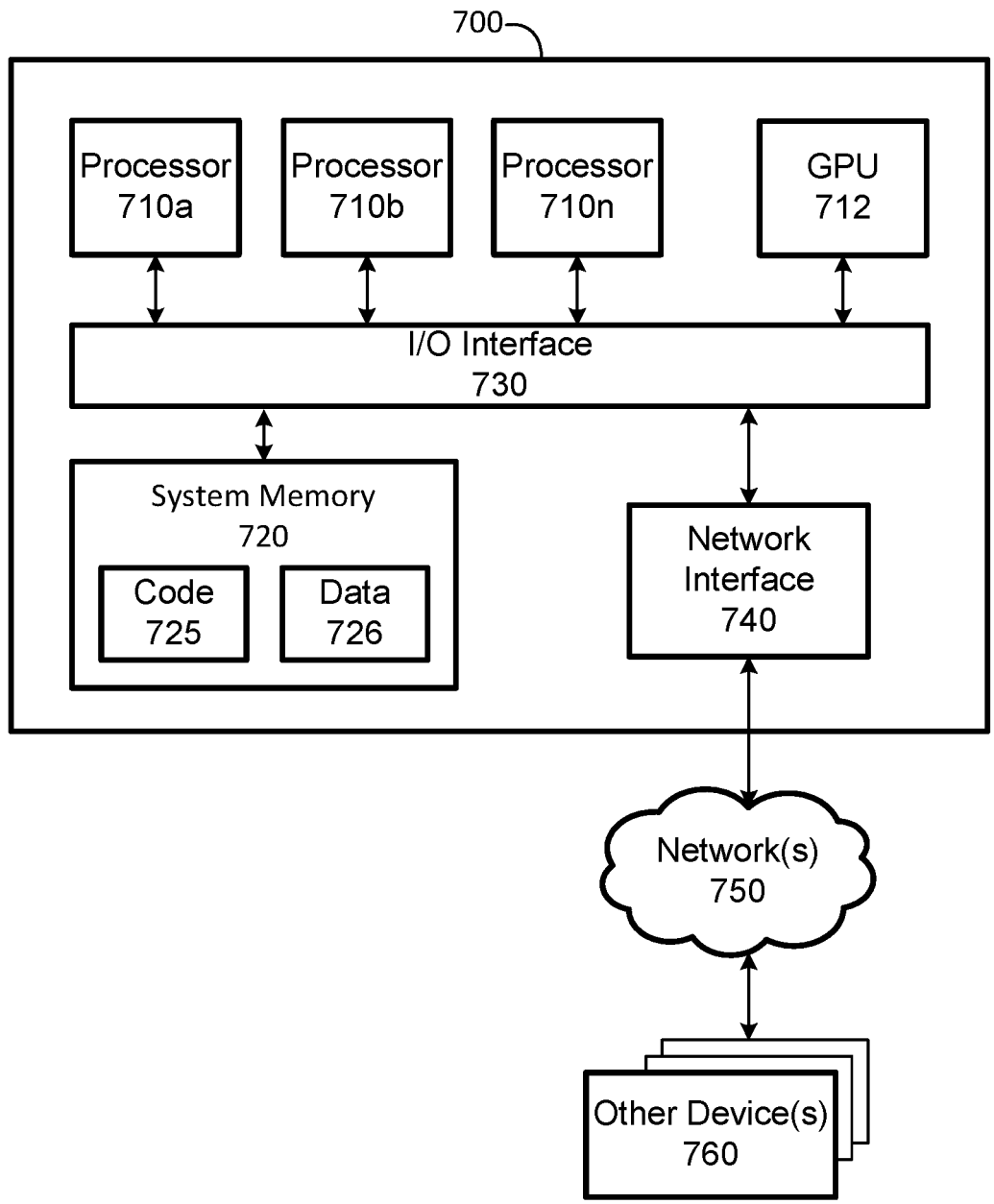
FIG. 7 is a block diagram of an example computing system.

FIG. 7 depicts a general-purpose computer system that includes or is configured to access one or more computer-accessible media. In the illustrated embodiment, a computing device 700 may include one or more processors 710*a*, 710*b*, and/or 710*n* (which may be referred herein singularly as the processor 710 or in the plural as the processors 710) coupled to a system memory 720 via an input/output (I/O) interface 730. The computing device 700 may further include a network interface 740 coupled to an I/O interface 730.

In various embodiments, the computing device 700 may be a uniprocessor system including one processor 710 or a multiprocessor system including several processors 710 (e.g., two, four, eight, or another suitable number). The processors 710 may be any suitable processors capable of executing instructions. For example, in various embodiments, the processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of the processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, the processors 710 and the GPU 712 may be implemented as one or more of the same type of device.

The system memory 720 may be configured to store instructions and data accessible by the processor(s) 710. In various embodiments, the system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within the system memory 720 as code 725 and data 726.

In one embodiment, the I/O interface 730 may be configured to coordinate I/O traffic between the processor(s) 710, the system memory 720 and any peripherals in the device, including an network interface 740 or other peripheral interfaces. In some embodiments, the I/O interface 730 may perform any necessary protocol, timing or other data transformations to convert data signals from one component (e.g., the system memory 720) into a format suitable for use by another component (e.g., the processor 710). In some embodiments, the I/O interface 730 may include support for devices attached through various types of peripheral buses, such as a variant of the Peripheral Component Interconnect (PCI) bus standard or the Universal Serial Bus (USB) standard, for example. In some embodiments, the function of the I/O interface 730 may be split into two or more separate components, such as a north bridge and a south bridge, for example. Also, in some embodiments some or all of the functionality of the I/O interface 730, such as an interface to the system memory 720, may be incorporated directly into the processor 710.

The network interface 740 may be configured to allow data to be exchanged between the computing device 700 and other device or devices 760 attached to a network or networks 750, such as other computer systems or devices, for example. In various embodiments, the network interface 740 may support communication via any suitable wired or wireless general data networks, such as types of Ethernet networks, for example. Additionally, the network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, the system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 700 via the I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of the computing device 700 as the system memory 720 or another type of memory. Further, a computer-accessible medium may include transmission media or signals, such as electrical, electromagnetic or digital signals, conveyed via a communication medium, such as a network and/or a wireless link, such as those that may be implemented via the network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It is to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
   determining, by a computing device, a manifest of a plurality of manifests associated with a content asset, wherein each manifest is associated with a different version of the content asset and comprises: an indication of one or more content segments of the version of the content asset, a manifest version associated with the version of the content asset, and one or more storage locations of the one or more content segments;
   determining a state file comprising an identifier associated with the manifest version of the determined manifest and one or more playback features, wherein the identifier facilitates use of the state file with the determined manifest;
   sending, to a recipient device, the manifest, wherein the recipient device is configured to retrieve at least one of the one or more content segments using the manifest; and
   sending, to the recipient device, the state file, wherein the recipient device is configured to use the state file to facilitate modifying, based on the one or more playback features, output of content of at least a portion of the at least one of the one or more content segments retrieved using the manifest.

2. The method of claim 1, wherein the content asset comprises at least one of a video on demand asset, a linear content asset, or a network digital video recorder asset.

3. The method of claim 1, wherein the different versions of the content asset differ in relation to at least one of a bit rate of the one or more content segments, a language of the one or more content segments, an image size of the one or more content segments, a limitation of the one or more content segments, or a combination thereof.

4. The method of claim 1, wherein the one or more playback features comprise one or more of an advertising cue, language information, content format, content manipulation, or entitlement information.

5. The method of claim 1, wherein sending the state file comprises sending, to a media player of the recipient device, the state file, wherein the media player is not configured to decode, from the content asset, data indicating the one or more playback features.

6. The method of claim 1, wherein determining the state file comprises generating the state file as part of a transcoding process associated with the content asset.

7. The method of claim 1, wherein the state file is time synchronized, based on one or more time codes in the state file, with the manifest.

8. A method comprising:
receiving a manifest of a plurality of manifests associated with a content asset, wherein each manifest is associated with a different version of the content asset and comprises: an indication of at least one content segment of the version of the content asset, a manifest version associated with the version of the content asset, and one or more storage locations of the at least one content segment;
receiving a state file that comprises data associated with one or more playback features;
determining, based on the state file, an identifier associated with the manifest version of the received manifest, wherein the identifier facilitates use of the state file with the determined manifest;
determining, based on the identifier, that the one or more playback features are associated with one or more of the manifest or the at least one content segment indicated by the manifest; and
modifying, based on the data associated with the one or more playback features, output of content of at least one content segment indicated by the manifest.

9. The method of claim 8, wherein the content comprises at least one of video on demand content, linear content, or network digital video recorder content.

10. The method of claim 8, wherein the different versions of the content asset differ in relation to at least one of a bit rate of the at least one content segment, a language of the at least one content segment, an image size of the at least one content segment, a limitation of the at least one content segment, or a combination thereof.

11. The method of claim 8, wherein the one or more playback features comprise one or more of an advertising cue, language information, content format, content manipulation, or entitlement information.

12. The method of claim 8, wherein receiving the state file comprises receiving the state file by a media player that is not configured to decode, from the content, data indicating the one or more playback features.

13. The method of claim 8, wherein state file is generated, by a transcoder, as part of a transcoding process associated with the content.

14. The method of claim 8, wherein the state file is time synchronized, based on one or more time codes in the state file, with the manifest.

15. A device comprising:
one or more processors; and
memory storing instructions that, when executed by the one or more processors, cause the device to:
receive, a manifest of a plurality of manifests associated with a content asset, wherein each manifest is associated with a different version of the content asset and comprises: an indication of at least one content segment of the version of the content asset, a manifest version associated with the version of the content asset, and one or more storage locations of the at least one content segment;
receive a state file that comprises data associated with one or more playback features;
determine, based on the state file, an identifier associated with the manifest version of the received manifest, wherein the identifier facilitates use of the state file with the received manifest;
determine, based on the identifier, that the one or more playback features are associated with one or more of the manifest or the at least one content segment; and
modify, in accordance the data associated with the one or more playback features, output of the content of the at least one content segment indicated by the manifest.

16. The device of claim 15, wherein the content comprises at least one of video on demand content, linear content, or network digital video recorder content.

17. The device of claim 15, wherein the different versions of the content asset differ in relation to at least one of a bit rate of the at least one content segment, a language of the at least one content segment, an image size of the at least one content segment, a limitation of the at least one content segment, or a combination thereof.

18. The device of claim 15, wherein the one or more playback features comprise one or more of an advertising cue, language information, content format, content manipulation, or entitlement information.

19. The device of claim 15, wherein the instructions that, when executed, cause the device to receive the state file comprises instructions that, when executed, cause the device to receive the state file by a media player that is not configured to decode, from the content, data indicating the one or more playback features.

20. The device of claim 15, wherein state file is generated, by a transcoder, as part of a transcoding process associated with the content.

* * * * *